United States Patent Office 3,134,781
Patented May 26, 1964

3,134,781
BENZANTHRAQUINONEACRIDINE VAT DYESTUFFS
Klaus Wunderlich and Hans-Samuel Bien, Leverkusen, and Fritz Baumann, Opladen, Germany, assignors to Farbenfabriken Bayer Aktiengesellschaft, Leverkusen, Germany, a corporation of Germany
No Drawing. Filed Sept. 5, 1961, Ser. No. 135,761
Claims priority, application Germany Sept. 6, 1960
8 Claims. (Cl. 260—274)

The present invention relates to novel vat dyestuffs of the benzanthrone series and a process of producing the novel vat dyestuffs.

It is known to treat Bz-1-benzanthronyl-(1-anthraquinonyl)-amine and derivatives thereof with alkaline condensation agents (German Patent 212,471). Besides, German Patents 520,876, 522,970 and 844,781 describe a production of olive-green colored dyestuffs from dyestuffs containing a free amino group in the 4- or 5-position of the anthraquinonyl radical by acylation of the free amino group for instance with benzoylchloride. These dyestuffs can also be produced directly from the corresponding 4- or 5 - acylamino-1-anthraquinonyl-(Bz-1-benzanthronyl)-amines by treatment for instance with sodium anilide and aniline (French Patent 697,231).

In accordance with the invention it has been found that novel vat dyestuffs are obtained by treating Bz-1-benzanthronyl-(1-anthraquinonyl)-amines which are substituted in the 4-position of the benzanthrone with condensation agents.

The Bz - 1-benzanthronyl-(1-anthraquinonyl)-amines used as starting products according to the invention can be prepared by converting 1-halogeno-anthraquinone which may be further substituted in 5-position by halogen into the benzanthrone according to conventional methods and converting the benzanthrone into the corresponding Bz-1,4-dihalogeno-benzanthrone by further halogenation. It is surprising that the halogen being in 4-position of the benzanthrone can be substituted extraordinarily easily for nucleophilic substituents. This property allows of introducing in a simple manner amino groups and substituted amino groups, such as for example acylamino-, arylamino- and aminoanthraquinonyl groups, cyanogen or carbonamide groups as well as mercapto- and sulfonyl groups into the benzanthrone. The aforesaid substituents may form rings together with the adjacent C-atoms in 3- or 10-position of the benzanthrone. Examples of novel benzanthrones of the aforesaid type are

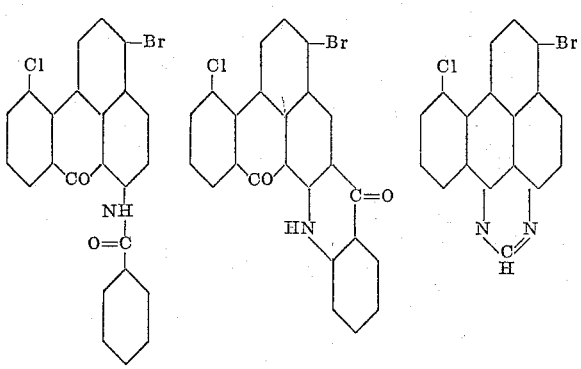

Derivatives which are substituted in the Bz-1-position by an anthraquinonylamino group can be obtained from the above benzanthrones which are substituted in 4-position according to known methods by an anthrimide melt with 1-aminoanthraquinone which may carry further substituents.

The Bz - 1-benzanthronyl-(1-anthraquinonyl)-amines can be treated according to the invention with acid as well as with alkaline condensation agents. Examples of condensation agents which are useful according to the invention are an alcoholic potassium hydroxide melt, a mixture of pyridine and $AlCl_3$, a mixture of sodium anilide and aniline, a mixture of ethanol amine and potassium hydroxide, sulfuric acid and a mixture of $AlCl_3$, $SO_2$ and NaCl.

The novel olive-green or green colored dyestuffs are distinguished by good or even very good fastness properties, in particular by excellent fastness to light. According to a preferred embodiment of the invention dyestuffs containing in 4-position of the benzanthrone an acylamino group, for instance a benzoylamino group, are used.

Instead of the benzoylamino group, the aforesaid dyestuffs may contain the most various aroylamino groups, for instance alkylbenzoylamino-, alkoxybenzoylamino-, halogenobenzoylamino-, dialkylsulfamido-benzoylamino-, naphthoylamino-, anthraquinonyl-carbonylamino-, aryldicarbonylamino- (for instance isophthaloyldiamino-) or benzthiazolcarbonylamino groups.

Most of the novel dyestuffs can be represented by the following formula

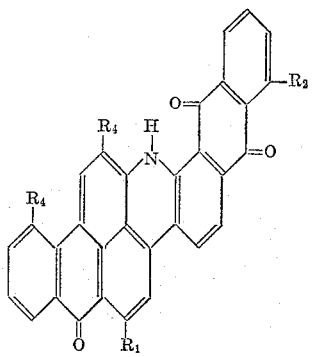

Formula 1 wherein $R_1$ stands for an amino group which may be substituted, a carbonamide group, a thioether group or a sulfon group, $R_2$ stands for hydrogen or an amino group which may be substituted, $R_3$ stands for hydrogen or a sulfonamide group and $R_4$ stands for hydrogen or chlorine.

Depending on the performance and the nature of the anthrimide melt and the condensation the chlorine atom standing in 8-position is replaced, wholly or partly, by hydrogen, however the chlorine content is of minor importance only as regards to the color and the properties of the dyestuffs.

As compared with the known dyestuffs carrying the acylamino group not in 4-position of the benzanthrone, but at the anthraquinonyl radical, the novel dyestuffs according to the invention are distinguished by a substantially clearer shade. The dyestuffs containing in 4- or 5-position of the anthraquinonyl radical further, not color-yielding substituents, for instance further acylamino groups, which are used as starting products according to the invention show strong, very yellowish-green shades.

The intermediate products which are used according to the invention in the synthesis of the novel dyestuffs are prepared as described in the following. These dyestuff intermediate products are marked by Roman numbers and reference is made thereto in the Examples illustrating the products of the novel dyestuffs.

Bz 1,4-DIBROMO-8-CHLORO-BENZANTHRONE (I) AND Bz 1-BROMO - 4.8 - DICHLORO - BENZANTHRONE RESPECTIVELY

The Bz 1.4-dibromo-8-chloro-benzanthrone is obtained as follows: 1.5-dichloro-anthraquinone is converted by conventional methods via the corresponding anthrone into 4.8-dichloro-benzanthrone (greenish-yellow colored needles, melting point 176–178° C. (upon re-crystallisation from nitrobenzene)). By brominating these compounds in nitrobenzene yellow needles of Bz 1.4-dibromo-8-chloro-benzanthrone are obtained which dissolve in sulfuric acid with a red-violet coloration and melt at 220–221° C. and at 225–226° C. after re-crystallisation from nitrobenzene. The Bz 1-bromo-4.8-dichloro-benzanthrone obtainable by brominating 4.8-dichloro-benzanthrone in a mixture of chloro acetic acid and hydrochlorid acid (yellow colored needles, melting point 216–217° C.) can also be used in the aforesaid syntheses with equal success.

Bz 1-BROMO-4-P-TOLUENE-SULFONAMIDO-8-CHLORO-BENZANTHRONE (II)

50 grams of Bz 1.4-dibromo-8-chloro-benzanthrone (I) are introduced at about 150° C. into a melt of 100 grams of p-toluene-sulfonamide, 0.4 gram of copper acetate and 32 grams of anhydrous sodium acetate. After heating to 170° C. for about 30 minutes the melt is diluted after cooling down to about 110° C. with glacial acetic acid and then heated to the boil. The yellow colored product is filtered off with suction, washed with glacial acetic acid, alcohol and a large quantity of hot water and then dried. The Bz 1-bromo-4-p-toluene-sulfonamido-8-chloro-benzanthrone is obtained in almost quantitative yield. Upon re-crystallisation from dimethyl formamide the yellow colored needles melt at 248–250° C. and dissolve in sulfuric acid with red-violet coloration.

Bz 1-BROMO-4-AMINO-8-CHLORO-BENZANTHRONE (III)

30 grams of sulfonamide compound II are dissolved in 370 grams of sulfuric acid and stirred at 30–40° C. for about 1 hour. The solution is then poured onto ice. The orange-yellow colored precipitate is filtered off with suction and washed with hot water and alcohol. The Bz 1-bromo-4-amino-8-chloro-benzanthrone is obtained in almost quantitative yield. Upon re-crystallisation from dimethyl formamide the yellow colored needles melt at 272–274° C. and dissolve in sulfuric acid in a thin layer with blue coloration and in a thick layer with violet-red coloration.

Alternatively, the Bz 1-bromo-4-amino-8-chloro-benzanthrone can be prepared directly from the Bz 1,4-dibromo-8-chloro-benzanthrone by reaction with ammonia in nitrobenzene at 210° C.

Bz 1-BROMO-4-CYANO-8-CHLORO-BENZANTHRONE (IV)

12 grams of Bz 1.4-dibromo-8-chloro-benzanthrone (I) are heated together with 5 grams of copper-I-cyanide in 75 grams of dimethyl formamide to 80–90° C. for 30 minutes. The reaction product is filtered off with suction in the cold, washed with dimethyl formamide and alcohol and extracted by boiling with dilute nitric acid. The light yellow colored needles of Bz 1-bromo-4-cyano-8-chloro-benzanthrone are obtained in almost quantitative yield. They dissolve in sulfuric acid with orange-brown coloration and melt at 320–322° C.

Bz 1-BROMO-4-CARBOXY-8-CHLORO-BENZANTHRONE (V)

68 grams of Bz 1-bromo-4-cyano-8-chloro-benzanthrone (IV) are saponified in 775 grams of sulfuric acid (82%) at 100° C. within 1 to 2 hours. By the dropwise addition of water carboxylic acid is precipitated in form of light yellow colored needles. The needles are filtered off with suction, washed neutral and dried. The yield is almost quantitative. The Bz 1-bromo-4-carboxy-8-chloro-benzanthrone melts above 300° C. and dissolves in sulfuric acid with violet coloration.

Bz 1-BROMO-8-CHLORO-BENZANTHRONE-4-CARBOXYLIC ACID CHLORIDE (VI)

31 grams of bromo-chloro-benzanthrone-carboxylic acid (V) are converted into its acid chloride in 85 grams of nitrobenzene with addition of 25 grams of thionyl chloride and 0.5 gram of pyridine at 120° C. within 2 hours. The resulting green-yellow colored needles are filtered off with suction after cooling, washed and dried.

By reaction of the chloride VI with 1 mol of 1-amino-anthraquinone an amide VII is obtained as yellow-colored needles which can be re-crystallised from quinoline. The amide VII dissolves in sulfuric acid with blue-green coloration.

Bz 1-BROMO-4-ANILINO-8-CHLORO-BENZANTHRONE (VIII)

A mixture of 30 grams of Bz 1.4-dibromo-8-chloro-benzanthrone (I), 30 grams of aniline, 15 grams of anhydrous sodium acetate and 110 grams of nitrobenzene is refluxed for about 30 minutes. After cooling the reaction product is filtered off with suction, washed with little nitrobenzene and alcohol and separated by boiling with water. The orange red colored needles of Bz 1-bromo-4-anilino-8-chloro-benzanthrone are obtained in almost quantitative yield; they dissolve in sulfuric acid with orange coloration and melt at 228–229° C. They can be re-crystallised from dimethyl formamide and nitrobenzene.

Bz 1-BROMO-8-CHLORO-BENZANTHRONYL-4.1'-ANTHRAQUINONYLIMIDE (IX)

A mixture of 8.5 grams of Bz 1.4-dibromo-8-chloro-benzanthrone (I), 4.6 grams of 1-amino-anthraquinone, 0.2 gram of copper acetate, 7.0 g. of anhydrous potassium carbonate and 60 grams of nitrobenzene is heated to boiling for 30–90 minutes. After cooling the product is filtered off with suction, washed with acetic anhydride and alcohol and separated by boiling with dilute hydrochloric acid. The red-brown colored anthrimide obtained by substitution of the bromine atom standing in 4-position dissolves in sulfuric acid with brown-red coloration.

Bz 1-BROMO-4.3-BENZACRIDONE-8-CHLORO-BENZANTHRONE (X)

A mixture of 48 grams of Bz 1.4-dibromo-8-chloro-benzanthrone (I), 48 grams of anthranilic acid methyl ester, 40 grams of anhydrous sodium acetate, 0.5 gram of copper acetate and 240 grams of nitrobenzene is heated to 190° C. for 1 to 2 hours. The bromine standing in 4-position is thereby substituted for the anthranilic acid methyl ester. After cooling the resulting orange-red colored needles are filtered off with suction and washed with alcohol. After separation by boiling and washing the ester Xa with water the product is obtained in almost quantitative yield.

50 grams of the ester (Xa) are introduced with stirring at 170° C. into 600 grams of polyphosphoric acid. The mixture is kept at 170° C. until the violet color of the sample in sulfuric acid no longer changes (about 1 hour). The mixture is then poured onto ice, heated to boiling, filtered off with suction and washed neutral. After re-crystallisation from nitrobenzene the acridone is obtained in dark red colored needles; the yield is almost quantitative.

The following examples are given for the purpose of illustrating the present invention, without being restricted thereto. The novel dyestuffs obtained as described in the examples are defined with reference to Formula 1, the substituents $R_1$ to $R_4$ being indicated only.

The chlorine content of the novel dyestuffs depends on the nature of the dyestuff and the reaction conditions applied. Depending on the prevailing conditions a larger or smaller amount of chlorine is replaced by hydrogen. The chlorine content is of minor importance only for the properties of the ultimate dyestuff. In general 40–100% of the chlorine standing in 8-position is replaced by hydrogen.

Example 1

A mixture of 5.7 grams of anthrimide (IX), 2.3 grams of 1-amino-anthraquinone, 0.2 gram of copper acetate, 5 grams of anhydrous potassium carbonate and 60 grams of nitrobenzene is heated to the boil for several hours. After cooling to 100° C. the product is filtered off with suction, washed with acetic anhydride and ethanol and separated by boiling with dilute hydrochloric acid. The resulting dark red-brown colored anthrimide dissolves in sulfuric acid with currant coloration.

The aforesaid anthrimide can also be obtained from the Bz 1.4.8-trihalo-benzanthrone.

11 grams of the anthrimide prepared from 1 mol. of Bz 1.4-dibromo-8-chloro-benzanthrone (I) and 2 mols. of 1 amino-anthraquinone are introduced into a melt of 20 grams of potassium hydroxide and 35 grams of ethanol amine at 100° C. and stirred at 130° C. for 3 hours. The melt is poured onto ice and oxidised by blowing through air. The dark olive colored dyestuff

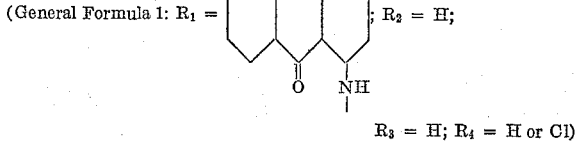

(General Formula 1: $R_1 =$ [structure]; $R_2 = H$; $R_3 = H$; $R_4 = H$ or Cl)

is filtered off with suction and washed neutral. If desired, the dyestuff can be purified by boiling out with dimethyl formamide and quinoline. The dyestuff dyes cotton from a grey vat greenish olive shades and dissolves in sulfuric acid with olive-green coloration. The chlorine content is 1.2%.

Example 2

A mixture of 7 grams of Bz 1-bromo-4-aniline-8-chloro-benzanthrone (VIII), 2.0 grams of 1-amino-anthraquinone, 4 grams of anhydrous potassium carbonate, 2 grams of anhydrous sodium acetate, 0.1 grams of copper acetate and 50 grams of nitrobenzene is heated to the boil. Another quantity of 2 grams of 1-amino-anthraquinone is added in small portions within 2 hours. After reaction time of 3 to 5 hours the resulting product is filtered off with suction at 80° C. washed with acetic anhydride and alcohol and separated by boiling with dilute hydrochloric acid. After washing neutral and drying the red-brown colored anthrimide is obtained in a very good yield. The compound dissolves in sulfuric acid with brown-red brown coloration.

6.3 grams of the anthrimide obtained from Bz 1-bromo-4-anilino-8-chloro-benzanthrone and 1-amino-anthraquinone are introduced at 100° C. into a melt of 15 grams of potassium hydroxide and 25 grams of ethanol amide. After 3 hours' heating to 110–120° C. the melt is poured into water and oxidised by blowing through air. The olive-green colored dyestuff

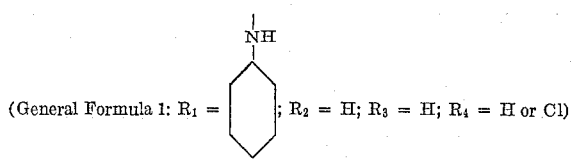

(General Formula 1: $R_1 =$ [structure]; $R_2 = H$; $R_3 = H$; $R_4 = H$ or Cl)

is filtered off with suction and washed neutral. The dyestuff dyes cotton from an olive vat in strong olive-green shades. The dyestuff dissolves in sulfuric acid with green coloration. The chlorine content is 2.5%.

Example 3

A mixture of 17.6 grams of anilino-benzanthrone (VIII), 10.5 grams of 1-amino-5-benzoylamino-anthraquinone, 17 grams of anhydrous potassium carbonate, 0.5 gram of copper acetate and 360 grams of nitrobenzene is heated to the boil. After about 60 minutes another 3.5 grams of 1-amino-5-benzoylaminoanthraquinone are added. After a reaction time of another 30 minutes the resulting product is filtered off with suction at 80° C., washed with nitrobenzene and alcohol and separated by boiling with dilute hydrochloric acid. The dark red-brown colored crystals of the anthrimide are obtained in a very good yield and dissolve in sulfuric acid with olive coloration.

36 grams of sodium are dissolved in 300 grams of aniline at 160° C. with the addition of 0.5 gram of powdered copper and while introducing nitrogen. 21 grams of the anthrimide prepared from Bz 1-bromo-4-anilino-8-chloro-benzanthrone and 1-amino-5-benzoylamino-anthraquinone are introduced into the melt at 130° C. and stirred at 140–150° C. for 3 hours. The reaction mixture is poured onto a mixture of ice and hydrochloric acid and the reaction product is filtered off with suction after heating to the boil and washed neutral. The resulting dyestuff

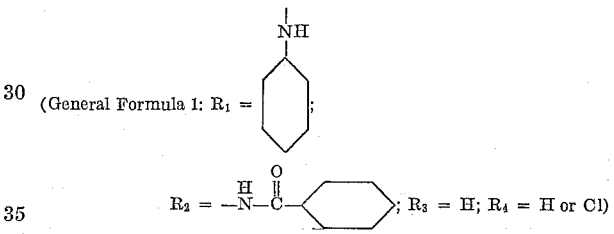

(General Formula 1: $R_1 =$ [structure]; $R_2 = -N-C-$ [structure]; $R_3 = H$; $R_4 = H$ or Cl)

can be purified by vatting, filtering and subsequently oxidising and, if desired, by boiling out with dimethyl formamide. The dyestuff dyes cotton from an olive-green colored vat strong yellowish olive-green shades. The dyestuff dissolves in sulfuric acid with green coloration. The chlorine content is 0.5%.

Example 4

A mixture of 23 grams of acridone (X), 11.5 grams of 1-amino-anthraquinone, 25 grams of potassium carbonate and 5 grams of potassium acetate as well as 0.5 gram of copper chloride is heated to the boil for 30 to 60 minutes. After cooling the red-brown colored needless of the anthrimide are filtered off with suction, washed with acetic anhydride and alcohol and separated by boiling with dilute hydrochloric acid. The anthrimide dissolves in sulfuric acid with olive coloration.

8 grams of potassium hydroxide and 3 grams of potassium acetate, anhydrous, are mixed with stirring with 20 grams of isobutanol at 80–100° C. until a clear melt results. Thereupon 4.5 grams of the anthrimide prepared from Bz 1-bromo-4.3-benzacridone-8-chloro-benzanthrone and 1-amino-anthraquinone are introduced and the temperature is raised to 130° C. After 3 hours the melt is poured into water and the reaction product oxidised at 60° C. by blowing through air. The resulting dyestuff dyes cotton from an olive vat olive colored shades.

Example 5

15 grams of the anthrimide described in Example 4 are heated in 350 grams of sulfuric acid (85%) to 110° C. for about 30 minutes. The reaction mixture is poured onto ice, filtered off with suction, washed neutral and dried. The resulting brown colored dyestuff dissolves in sulfuric acid with olive-green coloration and dyes cotton from a red-brown colored vat brown shades of good general fastness properties, in particular very good or even outstanding fastness to light.

Example 6

Sulfur dioxide is introduced with stirring into a mixture of 60 grams of aluminium chloride and 10 grams of sodium chloride until a clear melt results. Thereupon 12.5 grams of the anthrimide obtainable analogously to Example 4 by reacting the acridone (X) with 1-amino-5-benzoyl-amino-anthraquinone instead of 1-amino-anthraquinone are introduced into a melt. The temperature is kept at 100° C. for 60 minutes, the melt is then poured onto ice, rendered alkaline with sodium hydroxide solution and stirred at 80° C. for some time. The resulting product is filtered off with suction, thoroughly washed and dried. The resulting brown colored dyestuff dissolves in sulfuric acid with currant coloration and dyes cotton from a brown vat red-brown shades of good fastness properties.

Example 7

A mixture of 9.3 grams of Bz 1-bromo-4-cyano-8-chlorobenzanthrone (IV), 5.8 grams of 1-amino-anthraquinone, 12 grams of anhydrous potassium carbonate, 4 grams of anhydrous potassium acetate, 0.2 gram of copper acetate and 100 grams of nitrobenzene is heated to the boil while stirring for 60 minutes. After cooling to 80° C. the resulting product is filtered off with suction. The dark red colored crystals are washed with nitrobenzene and ethanol and separated by boiling with dilute hydrochloric acid. The anthrimide is thus obtained in a very good yield; it dissolves in sulfuric acid with olive-olive green coloration and can be re-crystallised from quinoline.

5 grams of the anthrimide prepared from Bz 1-bromo-4-cyano-8-chloro-benzanthrone and 1-amino-anthraquinone are introduced at 100° C. into a melt of 10 grams of potassium hydroxide, 5 grams of potassium acetate and 20 grams of isobutanol and then stirred at 120–130° C. for 3 hours. After introducing with stirring into water the product is oxidised by blowing air therethrough. The dyestuff

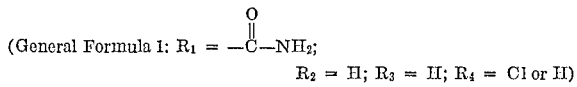

(General Formula 1: $R_1 = -\overset{O}{\overset{\|}{C}}-NH_2$;

$R_2 = H$; $R_3 = H$; $R_4 = Cl$ or $H$)

is filtered off with suction and washed neutral. The dyestuff dyes cotton from a brown vat strong olive colored shades of excellent or outstanding fastness to light and dissolves in sulfuric acid with olive-green coloration.

Example 8

12 grams of benzoylchloride are added dropwise at 130° C. into a mixture of 25 grams of Bz 1-bromo-4-amino-8-chlorobenzanthrone (III) and 220 grams of nitrobenzene. After 1 hour's heating to 130° C. the temperature is raised to 190° C. for a brief period. After cooling the product is filtered off with suction and washed with little nitrobenzene and alcohol. The yellow needles of Bz 1-bromo-4-benzoylamino-8-chloro-benzanthrone melt at 270–271° C. after re-crystallisation from nitrobenzene and dissolve in sulfuric acid in a thin layer in an olive-green coloration and in a thick layer in red coloration. The yield is almost quantitative.

Instead of benzoylchloride the most various carboxylic acid chlorides may be used, for instance alkyl-benzoic acid chlorides, alkoxy-benzoic acid chlorides, halogeno-benzoic acid chlorides, dialkyl-sulfonamide-benzoic acid chlorides, naphthoic acid chlorides, anthraquinonyl-carboxylic acid chlorides, aryl-dicarboxylic acid chlorides (for instance isophthalic acid dichloride) and benzthiazole-carboxylic acid chlorides.

60.5 grams of Bz 1-bromo-4-benzoylamino-8-chloro-benzanthrone, 40 grams of potassium carbonate (anhydrous), 1 gram of copper acetate, 26 grams of 1-amino-anthraquinone and 600 grams of nitrobenzene are heated to the boil for about 60 minutes. After the addition of another 5 grams of 1-amino-anthraquinone the product is filtered off with suction at 120° C. after a reaction time of totally about 2 to 3 hours. The product is washed with nitrobenzene, acetic anhydride and alcohol and isolated by boiling with dilute hydrochloric acid. The red-brown colored anthrimide dissolves in sulfuric acid with olive-green coloration and can be re-crystallised with quinoline.

72 grams of sodium are dissolved in 60 grams of aniline at 160° C. in a nitrogen atmosphere and with the addition of 0.4 gram of powdered copper. 43 grams of anthrimide prepared from Bz 1-bromo-4-benzoylamino-8-chloro-benzanthrone and 1-amino-anthraquinone are introduced into the resulting melt at 120° C. The temperature is slowly raised to 160° C. within 4 hours. The melt is poured onto a mixture of hydrochloric acid and ice and heated up to the boil. The product is filtered off with suction and washed neutral. The wet filtration cake is suspended in dilute sodium hydroxide solution. The leuco compound is oxidised by passing in air at about 60° C. The dyestuff is filtered off with suction and washed neutral. The dyestuff can be purified by vatting, filtering and subsequently oxidising and, if desired, by boiling out with dimethyl formamide and crystallisation from quinoline. The dark green colored dyestuff

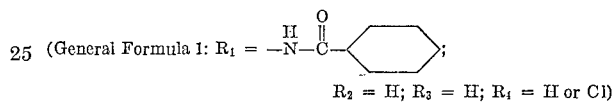

(General Formula 1: $R_1 = -N-\overset{O}{\overset{\|}{C}}-\langle\ \rangle$;

$R_2 = H$; $R_3 = H$; $R_4 = H$ or $Cl$)

dissolves in sulfuric acid with green coloration and dyes cotton from a blue-grey vat strong green shades of good fastness properties, in particular excellent fastness to light.

The ring closure of the anthrimide can also be accomplished according to Example 14, paragraph 2. The chlorine content of the resulting dyestuff is 0.3%.

(Independently of the chlorine content of the anthrimide used there is removed a larger or lesser amount of the chlorine atom in 8-position when the experiment is repeated under equal conditions. The chlorine content varies between 0 and 3%.)

A similar dyestuff is obtained when using Bz 1-bromo-4-(p-methoxy-benzoylamino)-8-chloro-benzanthrone instead of Bz 1-bromo-4-benzoylamino-4-chloro-benzanthrone. The product obtained by reaction of 2 mols of Bz 1-bromo-4-benzoylamino-8-chloro-benzanthrone and 1 mol of isophthalic acid dichloride according to the above described process likewise yields a green colored vat dyestuff of excellent good fastness properties.

Example 9

Analogously to the process described in Example 8, paragraph 4, there is converted the red-brown colored anthrimide (which dissolves in sulfuric acid with yellowish olive-green coloration) which is obtained by reacting 1-amino-5-benzoylamino-anthraquinone instead of 1-amino-anthraquinone according to Example 8, paragraph 3. The dyestuff

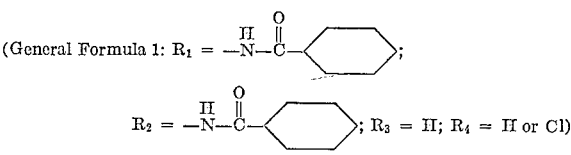

(General Formula 1: $R_1 = -N-\overset{O}{\overset{\|}{C}}-\langle\ \rangle$;

$R_2 = -N-\overset{O}{\overset{\|}{C}}-\langle\ \rangle$; $R_3 = H$; $R_4 = H$ or $Cl$)

which is obtained in form of olive-green colored needles after crystallisation from quinoline and dissolves in sulfuric acid with yellowish green coloration, dyes cotton from a blue vat strong, slightly dull, yellow-green shades of very good general fastness properties and excellent fastness to light. The chlorine content is 2.5%.

Example 10

According to the process described in Example 8, paragraph 4 the currant colored anthrimide (which dissolves in sulfuric acid with yellowish olive-green coloration) which is obtained by reacting 1-amino-4-benzoylamino-anthraquinone instead of 1-amino-anthraquinone according to Example 8, paragraph 3.

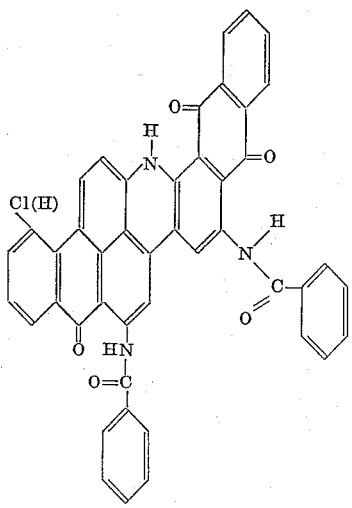

The dyestuff which is obtained in form of olive-green colored needles after crystallisation from quinoline and dissolves in sulfuric acid with yellowish green coloration, dyes cotton strong yellow-green shades of excellent fastness to light. The chlorine content is 2.7%.

*Example 11*

A mixture of 5.2 grams of Bz 1-bromo-4-p-toluene-sulfonamide-8-chloro-benzanthrone (II), 5 grams of anhydrous potassium carbonate, 2 grams of anhydrous potassium acetate, 2.5 grams of 1-amino-anthraquinone and 50 grams of nitrobenzene is heated to the boil for about 1½–2 hours. The reaction product is filtered off with suction at 150° C., washed with nitrobenzene and alcohol and separated by boiling with dilute hydrochloric acid. After filtering with suction, washing neutral and drying the anthrimide is obtained in a very good yield. The red-brown colored needles dissolve in sulfuric acid with dark green coloration.

The anthrimide prepared from Bz 1-bromo-4-p-toluene-sulfonamide-8-chloro-benzanthrone and 1-amino-anthraquinone is reacted as described in Example 8, paragraph 4. The resulting dyestuff (General Formula 1: $R_1 = -\overset{H}{N}-SO_2-\langle\ \rangle-CH_3$;

$R_2 = H; R_3 = H; R_4 = H$ or Cl)

which is obtained in form of dark green colored needles after crystallisation from quinoline and dissolves in sulfuric acid with green coloration, dyes cotton from a grey-blue vat strong green shades. The chlorine content is 1.1%.

*Example 12*

A mixture of 72 grams of Bz 1-bromo-4-amino-8-chloro-benzanthrone (III), 40 grams of anhydrous potassium carbonate, 2 grams of copper acetate, 30 grams of 1-amino-anthraquinone and 600 grams of nitrobenzene is heated to the boil. After about 1½ hours another 16 grams of 1-amino-anthraquinone are added and the reaction product is filtered off with suction at 60° C. after about 2½ hours, washed with nitrobenzene, acetic anhydride and alcohol and separated by boiling with dilute hydrochloric acid. After washing neutral and drying a red-brown colored anthrimide is obtained in a very good yield; it dissolves in sulfuric acid with currant-red coloration.

8 grams of the anthrimide prepared from Bz 1-bromo-4-amino-8-chloro-benzanthrone and 1-amino-anthraquinone are introduced at 100° C. into a melt of 15 grams of potassium hydroxide and 30 grams of ethanol amine. After 3 hours' heating to 130° C. the melt is poured onto ice and the resulting leuco compound oxidised by means of an air current. The dyestuff is filtered off with suction and washed neutral. The dark olive-green colored dyestuff.

(General Formula 1: $R_1 = -NH_2$; $R_2 = H$; $R_3 = H$; $R_4 = H$ or Cl)

dissolves in sulfuric acid with olive-green coloration and dyes cotton strong olive-green shades.

*Example 13*

A mixture of 35 grams of Bz 1-bromo-4-amino-8-chloro-benzanthrone, 35 grams of 2-phenyl-4-chloro-6.7-phthaloyl-quinazoline, 1 gram of anhydrous iron-III-chloride and 540 grams of nitrobenzene is heated to the boil. The reaction takes place immediately with the evolution of hydrochloric acid. After some time the product is filtered off with suction at 180° C., washed with nitrobenzene, alcohol and hot water and dried. The orange-yellow colored needles of the reaction product are obtained in a very good yield and dissolve in sulfuric acid with orange-red coloration.

A mixture of 17 grams of the above described compound, 10 grams of anhydrous potassium carbonate, 0.5 gram of copper acetate, 6 grams of 1-amino-anthraquinone and 360 grams of nitrobenzene is heated to the boil for several hours. The reaction product is filtered off with suction at 150° C., washed with nitrobenzene and alcohol and separated by boiling with dilute hydrochloric acid. After filtering with suction, washing neutral and drying the anthrimide is obtained in a very good yield. The red-brown colored needles dissolve in sulfuric acid with olive coloration and can be purified, if desired, by boiling out with quinoline.

Analogously to the process described in Example 8, paragraph 4, there is reacted the anthrimide prepared by the reaction of Bz 1-bromo-4-amino-8-chloro-benzanthrone and 2-phenyl-4-chloro - 6.7 - phthaloyl-quinazoline and subsequently with 1-amino-anthraquinone. The resulting dark olive-green dyestuff

$R_2 = H; R_3 = H; R_4 = H$ or Cl)

which dissolves in sulfuric acid with green coloration, dyes cotton from a blue vat strong yellowish-green shades of good fastness properties. The chlorine content is 0.9%.

*Example 14*

45 grams of Bz 1-bromo-4-benzoylamino-8-chloro-benzanthrone (prepared according to Example 8, paragraph 1) are introduced in small portions within about 5 hours into a mixture heated to 180° C. and consisting of 30 grams of 1,5-diamino-anthraquinone, 0.5 gram of copper acetate, 0.5 gram of powdered copper, 35 grams of potassium carbonate, 10 grams of potassium acetate and 600 grams of naphthalene. After a reaction time of totally 8–10 hours the melt is diluted with toluene at about 150° C. The product is filtered off with suction while hot, washed with toluene and methanol and liberated from adhering salts by boiling out with dilute hydrochloric acid. The brown-red colored anthrimide dissolves in concentrated sulfuric acid with yellowish green coloration.

15 grams of the anthrimide are heated to 155–160° C. for 3 hours together with 25 grams of sodium methylate, 80 grams of diethylene glycol monoethyl ether and 0.2 gram of powdered copper, the methyl alcohol set free being allowed to distil over. The dark blue colored melt is poured into about 2 liters of water and the leuco compound oxidised at about 60° C. by means of an air current. The dark olive-green colored product is filtered off with suction and washed neutral. If desired, the product can be purified by vatting, filtering and oxidising. The resulting dyestuff

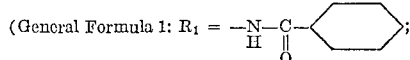

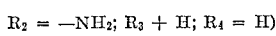

dissolves in sulfuric acid with bluish green coloration and dyes cotton from a blue-grey vat strong olive-green shades of good or very good general fastness properties. The chlorine content is 0.2%.

Example 15

5 grams of the dyestuff obtained according to Example 14 which is used in a state of finest subdivision, are reacted at 175° C. with 4 grams of 1-nitro-anthraquinone-2-carboxylic acid chloride in 100 ml. of o-dichloro-benzene. After the reaction is complete the acylation product is filtered off with suction, washed and introduced into 100 ml. of fresh o-dichloro-benzene. Ammonia is passed through the mixture at 175° C. until the substitution of the nitro group for the amino group is complete. The o-dichloro-benzene is driven off by means of steam, the residue is filtered off with suction, washed and dried. The dyestuff

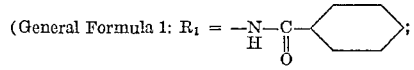

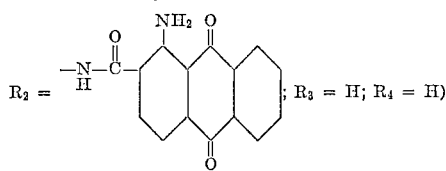

which is obtained in a very good yield dissolves in concentrated sulfuric acid with green coloration and dyes cotton from an olive colored vat black-brown shades of very good fastness properties. If desired, the dyestuff is purified by vatting, filtering and oxidising or by boiling out with quinoline.

Example 16

A mixture of 21.5 grams of Bz 1.4-dibromo-8-chlorobenzanthrone, 6.9 grams of potassium carbonate, 7.2 grams of p-chloro-thiophenol and 200 grams of ethyl alcohol is heated to the boil for 3 hours. The precipitated Bz 1-bromo - 4 - (p-chloro-phenyl-mercapto) - 8 - chlorobenzanthrone is filtered off with suction while hot, washed with ethyl alcohol and boiled out with water. Upon crystallisation from nitrobenzene the brownish yellow colored needles melt at 225–226° C. and dissolve in sulfuric acid with bluish red coloration.

The red-brown colored anthrimide prepared by reacting the aforesaid benzanthrone with 1-amino-anthraquinone dissolves in sulfuric acid with red-blue coloration and yields a dark green dyestuff by melting at 125° C. with a mixture of sodium methylate and diethylene glycol monomethyl ether (see Example 14, paragraph 2).

This dyestuff

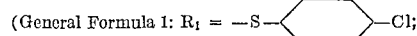

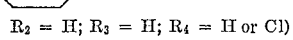

dissolves in sulfuric acid with blue-green coloration and dyes cotton from redidsh blue vat strong olive-green shades of good or very good general fastness properties. The chlorine content is 1.5%.

Example 17

A mixture of 43 grams of Bz 1.4-dibromo-8-chlorobenzanthrone (I), 20 grams of the sodium salt of 4-chloro-benzene sulfinic acid and 180 grams of dimethylformamide is stirred at 80° C. for 1 hour. The precipitated Bz 1-bromo-4-(p-chloro-phenyl-sulfonyl)-8-chlorobenzanthrone is filtered off with suction in the cold, washed with dimethylformamide and boiled out with water. Upon crystallisation from nitrobenzene, the yellow colored needles melt at 311–313° C. and dissolve in sulfuric acid with blue-green coloration.

The red-brown anthrimide prepared by reacting the aforesaid benzanthrone with 1-amino-anthraquinone dissolves in sulfuric acid with olive-brown coloration and yields a dark green dyestuff by melting at 145–150° C. with sodium methylate and diethylene glycol monoethyl ether (see Example 14, paragraph 2). The dyestuff

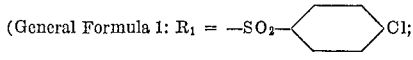

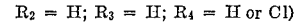

dissolves in concentrated sulfuric acid with blue-green coloration and dyes cotton from a grey-blue vat olive-green shades of good to very good general fastness properties. The chlorine content is 1.2%.

Example 18

10 grams of the dyestuff obtained according to Example 8, paragraph 4 are introduced at 20–50° C. into a mixture of 20 ml. of chloro-sulfonic acid and 5 ml. of thionyl chloride and heated to 50° C. for 2 hours. The melt is then poured onto ice, the precipitate is filtered off with suction and washed neutral. The wet filtration cake is covered by pouring with 100 ml. of a dimethylamine solution (about 50%), vigorously stirred for some hours and evaporated to dryness. To remove the salts the residue is boiled out twice with water, filtered off with suction and, if necessary, washed with pyridine-water (30%) to remove any sulfuric acid. Purification can be better accomplished by vatting, filtering and oxidising with the addition of 10% pyridine and subsequently washing with hot 20% pyridine and water.

The dyestuff

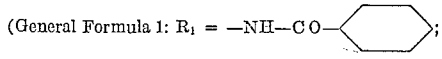

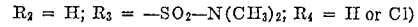

obtained in a very good yield dissolves in concentrated sulfuric acid with blue-green coloration and dyes cotton from a reddish blue vat strong bluish olive-green shades of very good fastness properties.

The chlorine content corresponds to that of the starting product (see Example 8, paragraphs 4 and 5 respectively).

We claim:
1. A compound of the formula

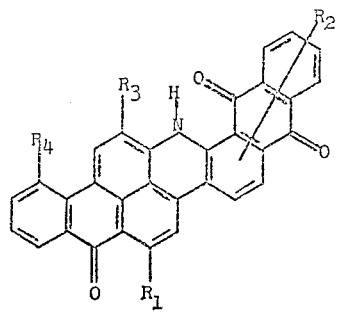

wherein $R_1$ is a member selected from the class consisting of amino, phenyl amino, benzoyl amino, phenyl mercapto, chlorophenyl mercapto, phenylsulfonyl, and methyl phenyl sulfonyl, $R_2$ is a member selected from the class consisting of amino, benzoyl amino and

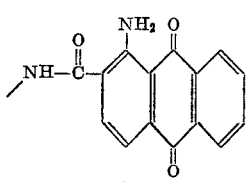

$R_3$ is a member selected from the class consisting of hydrogen and sulfodimethylamide, and $R_4$ is a member selected from the class consisting of hydrogen and chlorine.

2. A compound having the formula

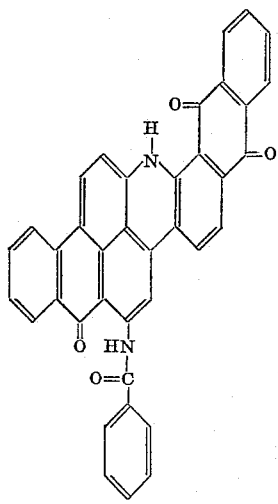

3. A compound having the formula

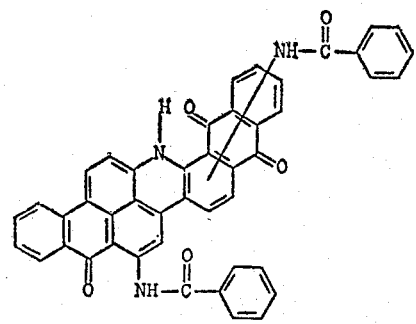

4. A compound having the formula

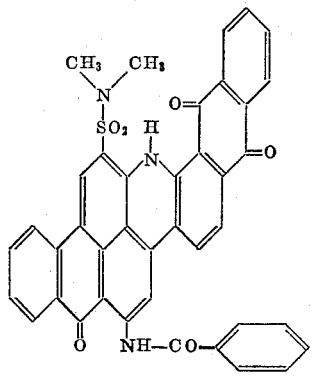

5. A compound having the formula

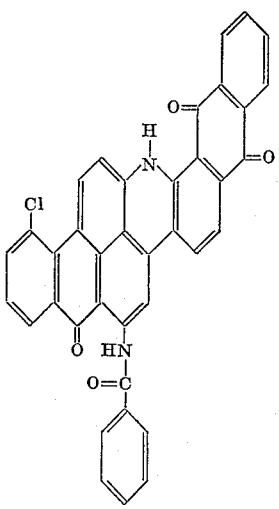

6. A compound having the formula

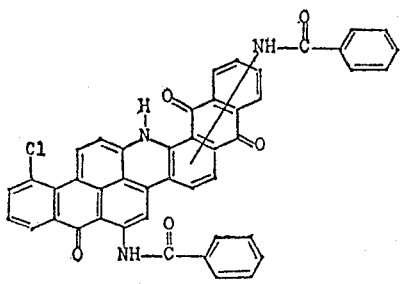

7. A compound having the formula

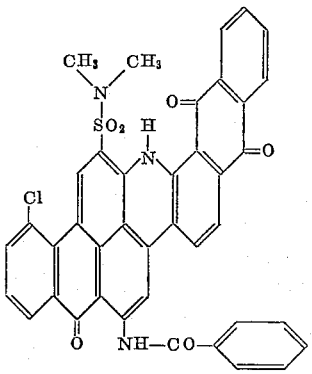

8. A dyestuff of the formula

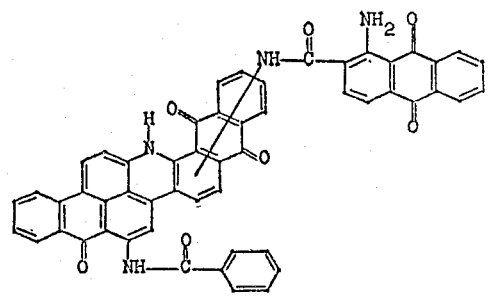

References Cited in the file of this patent
UNITED STATES PATENTS

| | | |
|---|---|---|
| 2,392,794 | Zerweck et al. | Jan. 8, 1946 |
| 2,483,238 | Scalera | Sept. 27, 1949 |
| 2,805,224 | Baumann et al. | Sept. 3, 1957 |
| 2,846,434 | Bien et al. | Aug. 5, 1958 |